Patented Oct. 5, 1948

2,450,784

UNITED STATES PATENT OFFICE 2,450,784

RESOLUTION OF N-FORMYLISOPROPYL-IDENEPENICILLAMINE

Walter Mark Duffin, Dartford, and Samuel Wilkinson, Beckenham, England, assignors to Therapeutic Research Corporation of Great Britain Limited, London, England, a corporation of Great Britain No Drawing. Application June 9, 1945, Serial No. 598,652. In Great Britain June 19, 1944

6 Claims. (Cl. 260—534)

This invention relates to a new and improved method for resolving dl-penicillamine to prepare the optically active isomers d-penicillamine and l-penicillamine therefrom.

The only known method for the preparation of optically active penicillamine consists in the resolution of N-formyl-S-benzy penicillamine by way of its brucine salt, followed by hydrolysis of the formyl group and reduction with sodium and liquid ammonia.

It is the object of this invention to provide a new and more convenient method for effecting this resolution.

We have now discovered that the preparation is much more conveniently accomplished by resolution of N-formyl-isopropylidenepenicillamine, and our invention accordingly comprises forming this compound

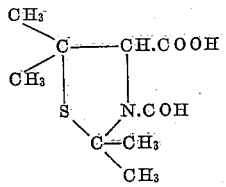

and then effecting the resolution thereof.

The said compound may be obtained in 90% yield by formylation of isopropylidenepenicillamine with formic acid and acetic anhydride and the resolution is effected in accordance with our invention with an aqueous or alcoholic solution of brucine or other optically active alkaloid which forms with the optical isomers of N-formyl-isopropylidenepenicillamine crystalline compounds of suitable solubility, which may be determined by simple test.

The brucine salt of the dextrorotatory-N-formyl-isopropylidenepenicillamine crystallises out very readily whereas that of the laevorotatory form is easily soluble in water. Separation is almost complete in one crystallisation and there is no need for the use of a different solvent for the isolation of the second form. On acidification of an aqueous solution or suspension of the brucine salt, the formyl compounds crystallise out in an almost pure condition and may be recrystallised from benzene if necessary.

Brucine is normally the alkaloid of choice, but if the l-isomer is required it can be obtained as the first crops by using l or dl ephedrine as the base, when the ephedrine l-N-formylisopropylidenepenicillamine forms the first crops. The separation is not normally so complete as when using brucine and the crops usually need recrystallisation. The salt with strychnine is too soluble for convenient crystallisation, and that with quinidine separates from alcohol or water as an oil.

The advantages of this method are the better yield of the N-formyl compound obtained in the initial formylation, the ready separation of the two forms in one crystallisation and the avoidance of reduction after resolution, which apart from its inconvenience involves a risk of partial racemisation.

The optically active N-formyl-isopropylidene compounds formed (or their brucine or other salts) may be converted into the corresponding penicillamines by hydrolysis, for example by warming with aqueous hydrochloric acid.

It is normally not necessary to get the crops absolutely pure before liberation of the resolved material by acidification, since the optically active and racemic forms can be separated by crystallisation.

As a modification of the process as above described, the N-formyl-isopropylidenepenicillamine may be combined with the alkaloid in a suitable solvent other than water or alcohol, this solvent being then removed by evaporation and the residue dissolved in water or alcohol and resolved by crystallisation.

The manner of carrying the invention into effect will now be illustrated by the following examples:

Example 1 dl-isopropylidenepenicillamine (13.6 grams) was dissolved in 98% formic acid (102 cubic centimetres) and, with continuous stirring, acetic anhydride (41 cubic centimetres) slowly run in over a period of 4 hours, the reaction vessel being cooled in a bath of cold water. When addition was complete, stirring was continued for a further 3 hours, water (41 cubic centimetres) then slowly added, and the mixture allowed to stand for one hour. The product was concentrated in vacuo and the resulting resin crystallised from a mixture of benzene and petroleum ether (boiling point 80–100° C.), when colourless prisms of N-formyl-isopropylidenepenicillamine were obtained, melting point 140–1° C. (Yield 14 grams.)

The N-formyl compound (14.6 grams) together with brucine (33.4 grams) was dissolved in 700 cubic centimetres hot water and allowed to stand for 48 hours to crystallise. The solid was filtered off and the filtrate concentrated to one-third of its bulk to obtain a further crop of crystals. The combined solids on treatment in aqueous suspension with hydrochloric acid went into solution and d-N-formyl-isopropylidenepenicillamine crystallised out, melting point 177–8°

$$[\alpha]_{5461}^{21} = +61°$$

(c=0.5 in alcohol). The aqueous filtrate from the resolution, on acidification with hydrochloric acid yielded l-N-formyl-isopropylidenepenicillamine (c=0.8 in alcohol).

$$[\alpha]_{5461}^{21} = -61°$$

(c=0.8 in alcohol).

d-N-formyl-isopropylidenepenicillamine (1 gram) was heated on the steam bath with 2N hydrochloric acid (50 cubic centimetres), a stream of carbon dioxide being passed continuously through the reaction mixture. The formyl derivative rapidly passed into solution. After one hour the product was cooled and extracted three times with ether and concentrated in vacuo, when long colourless needles of penicillamine hydrochloride were obtained (0.8 gram).

The penicillamine hydrochloride had an optical rotation $$[\alpha]_{5461}^{23} = +1.0°$$

(c =1.0 in water).

d-Penicillamine hydrochloride (300 milligrams) was heated with dry acetone (50 cubic centimetres) for 1 hour. The solution was shaken with a little charcoal, filtered and concentrated in vacuo. The resulting isopropylidenepenicillamine hydrochloride, which melted with decomposition at 196–200° C. showed $$[\alpha]_{5461}^{23} = +115°$$

(c = 0.9 in water). The isopropylidenepenicillamine hydrochloride was dissolved in 10 cubic centimetres water and treated with pyridine until neutral to Congo red. The solution was concentrated in vacuo to half volume, when isopropylidenepenicillamine crystallised. It was filtered off and recrystallised from acetone. The material had melting point 196–198° and showed an optical rotation of $$[\alpha]_{5461}^{23} = +131°$$

(c = 0.7 in water).

This substance can be converted in known manner if desired, into penicillamine by warming with aqueous hydrochloric acid.

Example 2

N-formylisopropylidenepenicillamine (5 grams) and dψ-ephedrine base (3.8 grams) were warmed into solution in water (50 cubic centimetres), the solution concentrated to one-third of its bulk and allowed to crystallise. The solid and filtrate were acidified as previously described yielding materials of rotation $$[\alpha]_{5461}^{20} = -52.4° \text{ and } +55.3°$$

from the solid and filtrate respectively. (All rotations are in alcohol, C = 0.4.)

Example 3

N-formylisopropylidenepenicillamine (2.5 grams) l-ephedrine base (1.9 grams) were warmed into solution in alcohol (25 cubic centimetres) and allowed to crystallise. Two crops were obtained which on acidification gave material with rotation $$[\alpha]_{5461}^{20} = -22° \text{ and } +23°$$

and from the filtrate +25°.

Example 4

N-formylisopropylidenepenicillamine (5 grams) and l-ephedrine base (3.8 grams) were warmed into solution in water (25 cubic centimetres) and allowed to crystalise. The first crop on acidification gave a product, melting point 179–180°

$$[\alpha]_{5461}^{20} = -60°$$

and the filtrate a product melting point about 165° C.

$$[\alpha]_{5461}^{20} = +2.4°$$

What we claim is:

1. A method of preparting optically active penicillamine which comprises formylating dl-isopropylidenepenicillamine to produce N-formyl-isopropylidenepenicillamine, reacting this substance with an optically active alkaloid which forms the optical isomers of N-formyl-isopropylidenepenicillamine crystalline compounds of different solubility, fractionally crystallizing these compounds from a solution to effect resolution and treating at least one of the crystalline compounds so obtained with a hydrolyzing agent to produce an optically active penicillamine.

2. A method of preparing optically active penicillamine which comprises formylating dl-isopropylidenepenicillamine to produce N-formyl-isopropylidenepenicillamine, reacting this substance with brucine, fractionally crystallizing the isomeric compounds so formed from a solution to effect resolution and treating at least one of the crystalline compounds so obtained with a hydrolyzing agent to produce an optically active penicillamine.

3. A method of preparing optically active penicillamine which comprises formylating dl-isopropylidenepenicillamine to produce N-formyl-isopropylidenepenicillamine, reacting this substance with l-ephedrine, fractionally crystallizing the isomeric compounds so formed from a solution to effect resolution and treating at least one of the crystalline compounds so obtained with a hydrolyzing agent to produce an optically active penicillamine.

4. A method of preparing optically active penicillamine which comprises formylating dl-isopropylidenepenicillamine to produce N-formyl-isopropylidenepenicillamine, reacting this substance with dψ-ephedrine, fractionally crystallizing the isomeric componds so formed from a solution to effect resolution and treating at least one of the crystalline compounds so obtained with a hydrolyzing agent to produce an optically active penicillamine.

5. A method of preparing optically active penicillamine which comprises formylating dl-isopropylidenepenicillamine to produce N-formyl-isopropylidenepenicillamine, reacting this substance with an optically active alkaloid which forms with the optical isomers of N-formyl isopropylidenepenicillamine crystalline compounds of different solubility, fractionally crystallizing these compounds from a solution to effect resolution and warming at least one of the crystalline compounds so obtained with aqueous hydrochloric acid to hydrolyze such compound to an optically active penicillamine.

6. A method of preparing optically active penicillamine which comprises treating dl-isopropylidenepenicillamine with a mixture of formic acid and acetic anhydride to produce N-formyl-isopropylidenepenicillamine, reacting this substance with brucine, fractionally crystallizing the isomeric compounds so formed from a solution to effect resolution, and warming at least one of the crystalline compounds so obtained with aqueous hydrochloric acid to hydrolyze such compound to an optically active penicillamine.

WALTER MARK DUFFIN.
SAMUEL WILKINSON.

REFERENCES CITED

The following references are of record in the file of this patent:

Du Vigneaud et al., "J. Biol. Chem.," vol. 109, pages 97–103.

Karrer, "Organic Chemistry," (1938), pages 92–93.

Wood et al., "J. Biol. Chem.," vol. 130, (1939), pages 109–114.

Ratner et al., "J. Am. Chem. Soc.," vol. 59, (1937,) pages 200 and 204.

British Report 82 (Copp et al.), July 7, 1944, pages 1, 2 and 3.

Upjohn Report 13b, October 16, 1944, pages 25 and 26.

Certificate of Correction

October 5, 1948.

Patent No. 2,450,784.

WALTER MARK DUFFIN ET AL.

It is hereby certified that errors appear in the printed specification of the above numbered patent requiring correction as follows:

Column 1, line 7, for "benzy" read *benzyl*; column 3, line 10, for "(c=0.8 in alcohol)." read *melting point 177–8°*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*